(12) United States Patent
Maeda et al.

(10) Patent No.: US 9,352,998 B2
(45) Date of Patent: May 31, 2016

(54) INSULATING LAYER FORMING MATERIAL, INSULATING LAYER FORMING PASTE

(71) Applicant: Nihon Yamamura Glass Co., Ltd., Hyogo (JP)

(72) Inventors: Kozo Maeda, Hyogo (JP); Yoshitaka Mayumi, Hyogo (JP); Hiroyuki Okada, Hyogo (JP)

(73) Assignee: NIHON YAMAMURA GLASS CO., LTD. (JP)

( * ) Notice: Subject to any disclaimer, the term of this patent is extended or adjusted under 35 U.S.C. 154(b) by 0 days.

(21) Appl. No.: 14/777,014

(22) PCT Filed: Mar. 28, 2014

(86) PCT No.: PCT/JP2014/059318
§ 371 (c)(1),
(2) Date: Sep. 15, 2015

(87) PCT Pub. No.: WO2014/157679
PCT Pub. Date: Oct. 2, 2014

(65) Prior Publication Data
US 2016/0031748 A1    Feb. 4, 2016

(30) Foreign Application Priority Data
Mar. 29, 2013    (JP) ................. 2013-072883

(51) Int. Cl.
| | | |
|---|---|---|
| C03C 17/36 | (2006.01) |
| C03C 10/00 | (2006.01) |
| C03C 3/087 | (2006.01) |
| C03C 3/095 | (2006.01) |
| C03C 12/00 | (2006.01) |
| C03C 8/14 | (2006.01) |
| C03C 8/20 | (2006.01) |
| C03C 8/24 | (2006.01) |

(52) U.S. Cl.
CPC ............. *C03C 10/0009* (2013.01); *C03C 3/087* (2013.01); *C03C 3/095* (2013.01); *C03C 8/14* (2013.01); *C03C 8/20* (2013.01); *C03C 8/24* (2013.01); *C03C 12/00* (2013.01); *C03C 2207/04* (2013.01)

(58) Field of Classification Search
CPC .. C03C 17/3417; C03C 17/3411; C03C 17/36
USPC ........................................ 428/426, 428, 432
See application file for complete search history.

(56) References Cited

U.S. PATENT DOCUMENTS

| | | | | |
|---|---|---|---|---|
| 5,057,376 A | * | 10/1991 | Sunahara | ............ C03C 10/0054 257/E23.009 |
| 5,763,059 A | * | 6/1998 | Yamaguchi | ............. H01L 23/15 257/E23.009 |

FOREIGN PATENT DOCUMENTS

| | | |
|---|---|---|
| JP | H0649591 B2 | 6/1994 |
| JP | 2005053775 A | 3/2005 |
| JP | 2011225414 A | 11/2011 |
| JP | 2011527663 A | 11/2011 |

* cited by examiner

*Primary Examiner* — Noah Wiese
(74) *Attorney, Agent, or Firm* — Bacon & Thomas, PLLC

(57) ABSTRACT

An insulating layer forming material and an insulating layer forming paste capable of forming an insulating layer on a metallic substrate without the filler and glass reacting or warpage occurring even when repeatedly fired at 850° C. or higher are provided. The insulating layer forming material containing a lead-free glass composition and an α-quartz filler contains 17.0-40.0 wt. % of the α-quartz filler and 60.0-83.0 wt. % of the lead-free glass composition. The α-quartz filler has an average particle diameter ($D_{50}$) of 1.0-3.5 μm and a specific surface area of 2.5-6.5 m²/g. The lead-free glass composition includes no $B_2O_3$ and comprises a composition, in mol %, of 40.0-60.0% $SiO_2$, 0.5-10.0% $Al_2O_3$, 20.0-45.0% MgO+CaO+SrO+BaO, 5.0-23.0% ZnO, and 0-10.0% $Li_2O+Na_2O+K_2O$.

15 Claims, No Drawings

INSULATING LAYER FORMING MATERIAL, INSULATING LAYER FORMING PASTE

TECHNICAL FIELD

The present invention relates to an insulating layer forming material and an insulating layer forming paste, and more particularly to an insulating layer forming material and an insulating layer forming paste suitable for forming an insulating layer to be laminated on a surface of a metallic substrate.

BACKGROUND ART

In forming an electronic circuit on a metallic substrate, an insulating paste, for example, is used to form an insulating layer on the substrate first, and then an electronic circuit including a conductive layer is formed on the insulating layer.

In this case, if the insulating layer has a thermal expansion coefficient considerably different from that of the metallic substrate, the metallic substrate may suffer warpage and/or the insulating layer may suffer cracking during firing or the like. Therefore, for matching the thermal expansion coefficients of the metallic substrate and the insulating layer, a ceramic filler is generally added to the paste.

Particularly, in the case of forming an insulating layer made up of a plurality of layers by repeating application of the insulating paste and firing, the lower layers constituting the insulating layer are exposed to high temperature many times repeatedly, which may promote crystallization or cause reaction with the filler.

Patent Document 1 below discloses an invention about a crystallizable glass for use as a dielectric layer on a substrate, and a thick membranous composition of the glass.

Patent Document 2 discloses a glass composition for use on an aluminum nitride substrate and a thick film dielectric composition containing the glass composition.

Patent Document 3 discloses an insulating layer used for forming an electronic circuit on a substrate made of metal or ceramic, and a method for producing the insulating layer.

PRIOR ART DOCUMENTS

Patent Documents

Patent Document 1: Japanese Patent Publication No. H6-49591
Patent Document 2: Japanese Patent Application Laid-Open No. 2005-53775
Patent Document 3: Japanese Patent National Publication No. 2011-527663

DISCLOSURE OF THE INVENTION

Problems to be Solved by the Invention

With the glass disclosed in Patent Document 1, however, the thermal expansion coefficient is too low with the glass alone. Of course, it is disclosed that the filler can be added up to about 15 wt. %, but if the substrate is made of a metallic material, the thermal expansion coefficient will not increase with the filler disclosed. Further, as the amount of the filler is small, the filler and the glass will react as the firing is repeated.

The glass composition disclosed in Patent Document 2 contains ZnO in large amount in the glass composition. This poses problems that the crystallization peak temperature is low and, thus, crystallization will take place at low temperature with reaction with the filler. This also leads to a problem that the insulating layer will not adhere to the substrate, or a problem that warpage would likely occur due to the low thermal expansion coefficient of the insulating layer relative to that of the substrate.

Further, the glass composition disclosed in Patent Document 3 contains boron as its component. This poses a problem that boron will react with the vehicle to generate blisters, thereby causing bulging.

Therefore, an object of the present invention is to provide an insulating layer forming material and an insulating layer forming paste capable of forming an insulating layer on a metallic substrate, without the filler and glass reacting or warpage occurring, even when firing is repeated at 850° C. or higher.

Means for Solving the Problems

In view of the foregoing problems of the conventional techniques, the inventors have vigorously carried out investigations and found that, when an α-quartz filler having a certain particle size and specific surface area and a glass composition having components in a certain range are mixed at a prescribed ratio and the mixture is fired at 850° C. or higher, then an insulating layer which hardly suffers warpage on a metallic substrate can be formed. They have conducted further investigations on the basis of this finding, and finally completed the present invention.

Specifically, an insulating layer forming material of the present invention is an insulating layer forming material containing a lead-free glass composition and an α-quartz filler, and has a first feature that:

it contains 17.0-40.0 wt. % of the α-quartz filler and 60.0-83.0 wt. % of the lead-free glass composition, the α-quartz filler has an average particle diameter ($D_{50}$) of 1.0-3.5 μm and a specific surface area of 2.5-6.5 $m^2/g$, and the lead-free glass composition includes no $B_2O_3$ and comprises a composition, in mol %, of 40.0-60.0% $SiO_2$, 0.5-10.0% $Al_2O_3$, 20.0-45.0% MgO+CaO+SrO+BaO, 5.0-23.0% ZnO, and 0-10.0% $Li_2O+Na_2O+K_2O$.

Further, the insulating layer forming material of the present invention has, in addition to the above-described first feature, a second feature that the content of the α-quartz filler is 20.0-35.0 wt. % and the content of the lead-free glass composition is 65.0-80.0 wt. %.

Further, the insulating layer forming material of the present invention has, in addition to the above-described first or second feature, a third feature that the lead-free glass composition includes no $B_2O_3$ and comprises a composition, in mol %, of 40.0-55.0% $SiO_2$, 3.0-8.0% $Al_2O_3$, 20.0-40.0% MgO+CaO+SrO+BaO, 10.0-18.0% ZnO, and 0-2.0% $Li_2O+Na_2O+K_2O$.

Further, the insulating layer forming material of the present invention has, in addition to any of the above-described first through third features, a fourth feature that a ceramic filler is contained in an amount of 0.01-10.0 parts by weight with respect to 100 parts by weight in total of the lead-free glass composition and the α-quartz filler.

Further, the insulating layer forming material of the present invention has, in addition to the above-described fourth feature, a fifth feature that the ceramic filler contains one species or two or more species selected from $TiO_2$, MgO, $ZrO_2$, $BaTiO_3$, $SrTiO_3$, and $BaZrO_3$.

Further, the insulating layer forming material of the present invention has, in addition to the above-described fourth feature, a sixth feature that the ceramic filler is a crystallized glass formed by heat treatment at 800° C. or higher, and its thermal expansion coefficient α from 50° C. to 850° C. is $120 \times 10^{-7}/°$ C. or more.

Further, an insulating layer forming paste of the present invention has a seventh feature that it is obtained by adding at least an organic binder and a solvent to the insulating layer forming material according to any of the first through sixth features described above.

Effects of the Invention

According to the insulating layer forming material recited in claim 1, it is possible to form an insulating layer which is almost free of defects, even when firing is conducted at a temperature of 850° C. or higher, and which is dense and excellent in bonding strength and has little warpage, on a metallic substrate having a thermal expansion coefficient of $80\text{-}120 \times 10^{-7}/°$ C. at 50-500° C. Further, it is possible to form a sealing layer composed of an insulating layer at a site where it is necessary to seal between metal and ceramic or between metal and metal which are used at high temperatures.

According to the insulating layer forming material recited in claim 2, in addition to the effects obtained by the configuration recited in claim 1 above, it is possible to form an insulating layer which is denser and more excellent in bonding strength and has less warpage, on a stainless steel substrate.

According to the insulating layer forming material recited in claim 3, in addition to the effects obtained by the configuration recited in claim 1 or 2 above, it is possible to form an insulating layer which is further denser and has less warpage, on the stainless steel substrate.

According to the insulating layer forming material recited in claim 4, in addition to the effects obtained by the configuration recited in any of claims 1 to 3 above, the ceramic filler contained in an amount of 0.01-10.0 parts by weight with respect to 100 parts by weight in total of the lead-free glass composition and the α-quartz filler makes it possible to provide an insulating layer the thermal expansion coefficient of which is readily adjustable, and which is dense and has little warpage.

According to the insulating layer forming material recited in claim 5, in addition to the effects obtained by the configuration recited in claim 4 above, the ceramic filler contains one species or two or more species selected from $TiO_2$, MgO, $ZrO_2$, $BaTiO_3$, $SrTiO_3$, and $BaZrO_3$. This makes it possible to provide an insulating layer the thermal expansion coefficient of which is more readily adjustable, and which is denser and has less warpage.

According to the insulating layer forming material recited in claim 6, in addition to the effects obtained by the configuration recited in claim 4 above, the ceramic filler is a crystallized glass formed by heat treatment at 800° C. or higher, and its thermal expansion coefficient α from 50° C. to 850° C. is $120 \times 10^{-7}/°$ C. or more. This makes it possible to provide an insulating layer the thermal expansion coefficient of which is more readily adjustable, and which is denser and has less warpage.

According to the insulating layer forming paste recited in claim 7, which is obtained by adding at least an organic binder and a solvent to the insulating layer forming material recited in any of claims 1 to 6 above, it is readily possible to form, on a metallic substrate, an insulating layer which is dense and excellent in bonding strength, and has little warpage. It is also readily possible to form a sealing layer composed of insulation at the site where it is necessary to seal between metal and ceramic, or between metal and metal, used at high temperatures.

MODES FOR CARRYING OUT THE INVENTION

A description will now be made about the reasons for restricting the components for the insulating layer forming material and the insulating layer forming paste of the present invention.

(1) Glass Composition

The reasons for restricting the components and their contents of the lead-free glass composition in the insulating layer forming material of the present invention will be described.

$SiO_2$ is an oxide which forms a network of the glass. It is preferably contained in the range of 40.0-60.0 mol %. If the content of $SiO_2$ is less than 40.0 mol %, glass may not be obtained, or even if it is obtained, the glass may have poor formability. If the content exceeds 60.0 mol %, the softening point will become high, in which case a dense insulating layer may not be obtained at a desired temperature.

In consideration of formability, firing temperature, and other properties of the glass, the content of $SiO_2$ is more preferably 40.0-55.0 mol %.

$Al_2O_3$ is a component which improves formability of the glass and adjusts the crystallization starting temperature. It is preferably contained in the range of 0.5-10.0 mol %. If the content of $Al_2O_3$ is less than 0.5 mol %, it may not be possible to adjust the crystallization starting temperature. If it exceeds 10.0 mol %, it may remain undissolved.

In consideration of adjustment of the crystallization starting temperature as well as formability and other properties of the glass, the content of $Al_2O_3$ is more preferably 3.0-8.0 mol %.

MgO, CaO, SrO, and BaO are components which improve formability of the glass and adjust the thermal expansion coefficient. They are preferably contained in the range of 20.0-45.0 mol % in total of MgO+CaO+SrO+BaO. If the content of MgO+CaO+SrO+BaO is less than 20.0 mol %, although glass is obtained, its softening point will become high, in which case a dense insulating layer may not be obtained. If it is 45.0 mol % or more, glass may not be obtained, or even if it is obtained, the glass may have poor formability.

In consideration of formability, firing temperature, and other properties of the glass, the content of MgO+CaO+SrO+BaO is more preferably 20.0-40.0 mol % in total.

ZnO is a component which improves formability of the glass and decreases the thermal expansion coefficient. It is preferably contained in the range of 5.0-23.0 mol %. If the content of ZnO is less than 5.0 mol %, although glass can be obtained, its softening temperature will become high, in which case a dense insulating layer may not be obtained. If the content is 18.0 mol % or more, the thermal expansion coefficient of the glass may not be increased.

In consideration of formability, thermal expansion coefficient, and other properties of the glass, the content of ZnO is more preferably 10.0-18.0 mol %.

$Li_2O$, $Na_2O$, and $K_2O$ are components which improve formability of the glass. They can be contained up to 10.0 mol % in total. If the content of $Li_2O+Na_2O+K_2O$ is 10.0 mol % or more, although glass can be obtained, the glass may become poor in weather resistance and it may suffer migration.

In consideration of formability and weather resistance of the glass as well as migration therein, the content of $Li_2O+Na_2O+K_2O$ is preferably 2.0 mol % or less, and more preferably 1.0 mol % or less.

In addition to the above-described components, $ZrO_2$, $La_2O_3$, and the like can be added for the purposes of improving the stability during the glass manufacturing process, restricting reaction with the substrate, improving adhesive property to the substrate, and adjusting the kinds and ratios of crystals precipitated.

On the other hand, it is preferable that $B_2O_3$ is substantially not contained because, although it may help stabilize the state of glass when producing the glass, it might react with a vehicle.

As used herein, the expression "substantially not contained" is not intended to preclude the case where the component is contained at the level of impurity; it implies that the inclusion of the component may be permitted as long as it is included as an impurity in the raw materials used to produce glass powder, for example.

More specifically, there is a low risk of problems occurring even if the above component is contained, as long as the total content is 1000 ppm or less in terms of oxide, which corresponds to the state where it is substantially not contained. From the standpoint of more reliably preventing the occurrence of the above problem, however, the content is more preferably 100 ppm or less.

(2) α-Quartz Filler

The reasons for restricting the content of the α-quartz filler in the insulating layer forming material of the present invention will be described.

The α-quartz filler, when mixed with glass, increases the thermal expansion coefficient. It is preferably contained in the range of 17.0-40.0 wt. %.

In the case where stainless steel or other metal used as a substrate has the thermal expansion coefficient of $80\text{-}120 \times 10^{-7}/°C$., if the content of the α-quartz filler is less than 17.0 wt. %, the thermal expansion coefficient will be too low, causing a discrepancy with the thermal expansion coefficient of the substrate, which would likely cause warpage. If the content exceeds 40 wt. %, the amount of the glass will decrease, in which case a dense insulating layer may not be obtained.

In consideration of obtaining a dense insulating layer, the content of the α-quartz filler is preferably 20.0-35.0 wt. %.

It is preferable that the α-quartz filler has an average particle diameter ($D_{50}$) of 1.0-3.5 μm and a specific surface area of 2.5-6.5 $m^2/g$.

If the average particle diameter of the α-quartz filler is 1.0 μm or less, the α-quartz filler is liable to coagulate, probably causing insulation failure. It also becomes liable to react with the glass. If the average particle diameter of the α-quartz filler is 3.5 μm or more, some particles may exceed the film thickness. Further, bubbles may remain after firing, in which case cracks are liable to occur on the substrate.

If the specific surface area of the α-quartz filler is 6.5 $m^2/g$ or more, the α-quartz will coagulate and cause insulation failure, in which case the withstand voltage test cannot be passed. If the specific surface area is 2.5 $m^2/g$ or less, bubbles may remain after firing, which may cause cracks on the substrate.

It is more preferable that the α-quartz filler has an average particle diameter ($D_{50}$) of 1.5-3.0 μm and a specific surface area of 4-6 $m^2/g$.

(3) Ceramic Filler

In addition to the α-quartz filler, a ceramic filler can be added for the purposes of finely adjusting and improving the thermal expansion coefficient.

The ceramic filler is preferably added in an amount of 0.01-10.0 parts by weight with respect to 100 parts by weight as a total amount of the α-quartz filler and the lead-free glass composition.

If it is added less than 0.01 parts by weight, a desired effect cannot be obtained. If it is added more than 10.0 parts by weight, it will decrease the fluidity during firing, thereby obstructing the flow undesirably.

In consideration of improved thermal expansion coefficient, the ceramic filler is more preferably added in an amount of 0.03-7.0 parts by weight, and still more preferably in an amount of 0.1-6.0 parts by weight.

As the ceramic filler, besides titania ($TiO_2$), partially stabilized zirconia ($ZrO_2$), magnesia (MgO), $BaTiO_3$, $SrTiO_3$, $BaZrO_3$, and the like can be used.

(4) Crystallized Glass

The crystallized glass as the ceramic filler is formed by heat treatment at 800° C. or higher. For further facilitating the adjustment of the thermal expansion coefficient of the insulating layer forming material, the thermal expansion coefficient α of the crystallized glass from 50° C. to 850° C. is preferably $120 \times 10^{-7}/°C$. or more.

The components and their contents of the crystallized glass composition are preferably, in mol %, 35.0-55.0% $SiO_2$, 0-5.0% $Al_2O_3$, 20.0-55.0% MgO+CaO+SrO+BaO, 5.0-30.0% ZnO, 0-2.0% $Li_2O+Na_2O+K_2O$, 0-10.0% $TiO_2+ZrO_2$, and 0-2.0% $La_2O_3$, and more preferably 40.0-50.0% $SiO_2$, 0-3.0% $Al_2O_3$, 25.0-50.0% MgO+CaO+SrO+BaO, 5.0-25.0% ZnO, 0-1.0% $Li_2O+Na_2O+K_2O$, 0-6.0% $TiO_2+ZrO_2$, and 0-2.0% $La_2O_3$.

[Production of Lead-Free Glass Compositions and their Powders]

As shown in Tables 1 and 2, raw materials were prepared and mixed to obtain glass compositions indicated as Glasses 1 to 10 and Comparative Glass 1. Each mixture was placed in a platinum crucible and melted at a temperature of 1450-1500° C. for two hours. It was then cooled rapidly by a twin-roll method to obtain glass flakes. It was also spread on a carbon plate heated in advance, to produce a block. The block was then placed in an electric furnace set at a temperature approximately 50° C. higher than an expected glass transition point, and allowed to cool slowly. The glass flakes were also placed in a pot mill, where they were crushed into glass powder.

[Production of α-Quartz Fillers]

As to the α-quartz fillers, filler powders as raw materials may be subjected to dry crushing, wet crushing, classification or the like, to obtain desired powders as α-Quartz Fillers 1 to 4 and Comparative Fillers 1 and 2.

[Production of Ceramic Fillers]

As to the ceramic fillers, ceramic filler powders as raw materials of $TiO_2$, MgO, $ZrO_2$, $BaTiO_3$, $SrTiO_3$, and $BaZrO_3$ may be subjected to dry crushing, wet crushing, classification or the like, to obtain desired powders.

[Production of Crystallized Glasses]

For using crystallized glasses as the fillers, as shown in Table 4, raw materials were prepared and mixed to obtain compositions of Crystallized Glasses 1 to 3. Each mixture was placed in a platinum crucible and melted at a temperature of 1450-1500° C. for two hours, and then cooled rapidly by a twin-roll method to obtain glass flakes. The glass flakes were placed in a pot mill, where they were crushed into glass powder. The glass powder was subjected to heat treatment at 800° C. or higher for several hours. It was then subjected to dry crushing, wet crushing, classification or the like to obtain powder of the crystallized glass.

[Test Methods]

As to the lead-free glass compositions, the softening point of the glass powder, the crystallization peak temperature, the thermal expansion coefficient of the glass block, and average particle diameter were measured for each of Glasses 1 to 10 and Comparative Glass 1, in the manner described below. The results are shown in Tables 1 and 2.

For the α-quartz filler powders, the average particle diameter and specific surface area were measured in the manner described below. The results are shown in Table 3.

For Crystallized Glasses 1 to 3, the thermal expansion coefficient was measured. The results are shown in Table 4.

TABLE 1

|  |  | Glass 1 | Glass 2 | Glass 3 | Glass 4 | Glass 5 | Glass 6 | Glass 7 |
|---|---|---|---|---|---|---|---|---|
| Glass Composition (mol %) | $SiO_2$ | 47.0 | 47.2 | 47.4 | 43.9 | 47.9 | 45.9 | 46.6 |
|  | $Al_2O_3$ | 5.7 | 5.7 | 3.3 | 5.8 | 5.8 | 5.6 | 0.6 |
|  | MgO |  |  |  |  |  |  | 15.4 |
|  | CaO | 5.9 | 5.9 | 6.0 | 6.1 | 6.0 | 10.1 | 20.0 |
|  | SrO | 10.4 | 11.3 | 11.3 | 11.5 | 11.4 | 11.0 |  |
|  | BaO | 12.5 | 12.5 | 12.6 | 12.8 | 14.3 | 10.6 | 2.8 |
|  | ZnO | 15.3 | 15.4 | 15.4 | 15.7 | 12.5 | 14.9 | 14.5 |
|  | $Na_2O$ | 0.7 |  |  |  |  |  |  |
|  | $K_2O$ | 0.4 |  |  |  |  |  |  |
|  | $ZrO_2$ | 2.0 | 2.0 | 4.1 | 4.1 | 2.1 | 2.0 |  |
|  | $La_2O_3$ |  |  |  |  |  |  |  |
| MgO + CaO + SrO + BaO |  | 28.8 | 29.7 | 29.9 | 30.4 | 31.7 | 31.7 | 38.2 |
| $Li_2O + Na_2O + K_2O$ |  | 1.1 |  |  |  |  |  |  |
| Softening Point Ts (° C.) |  | 780 | 783 | 780 | 791 | 787 | 791 | 741 |
| Crystallization Peak Temperature Tp (° C.) |  | 952 | 946 | 1014 | 974 | 971 | 1005 | 928 |
| Difference between Crystallization Peak Temperature and Softening Point (° C.) Tp − Ts |  | 172 | 163 | 234 | 183 | 184 | 214 | 187 |
| Thermal Expansion Coefficient α 50-550° C. ($10^{-7}/°$ C.) |  | 82 | 79 | 80 | 78 | 80 | 82 | 79 |
| Average Particle Diameter $D_{50}$ (μm) |  | 3.2 | 3.2 | 2.8 | 2.9 | 2.9 | 3.0 | 5.0 |

TABLE 2

|  |  | Glass 8 | Glass 9 | Glass 10 | Comparative Glass 1 |
|---|---|---|---|---|---|
| Glass Composition (mol %) | $SiO_2$ | 47.0 | 49.6 | 58.8 | 40.0 |
|  | $Al_2O_3$ | 1.0 | 2.9 | 2.1 | 2.0 |
|  | MgO |  |  |  |  |
|  | CaO | 26.0 | 23.3 | 12.6 | 13.0 |
|  | SrO |  |  | 6.8 |  |
|  | BaO | 10.5 | 10.0 | 4.6 | 20.0 |
|  | ZnO | 13.5 | 14.3 | 8.7 | 25.0 |
|  | $Na_2O$ |  |  | 3.4 |  |
|  | $K_2O$ |  |  | 3.0 |  |
|  | $ZrO_2$ |  |  |  |  |
|  | $La_2O_3$ | 2.0 |  |  |  |
| MgO + CaO + SrO + BaO |  | 36.5 | 33.3 | 24.0 | 33.0 |
| $Li_2O + Na_2O + K_2O$ |  |  |  | 6.4 |  |
| Softening Point Ts (° C.) |  | 758 | 755 | 664 | 758 |
| Crystallization Peak Temperature Tp (° C.) |  | 979 | 998 | did not detect | 838 |
| Difference between Crystallization Peak Temperature and Softening Point (° C.) Tp − Ts |  | 221 | 243 | — | 80 |
| Thermal Expansion Coefficient α 50-550° C. ($10^{-7}/°$ C.) |  | 93 | 84 | 98 | 83 |
| Average Particle Diameter $D_{50}$ (μm) |  | 4.6 | 4.3 | 4.3 | 4.9 |

TABLE 3

| α-Quartz Filler | Average Particle Diameter $D_{50}$ (μm) | Specific Surface Area ($m^2/g$) |
|---|---|---|
| Filler 1 | 3.1 | 3.0 |
| Filler 2 | 2.6 | 4.6 |
| Filler 3 | 1.6 | 5.9 |
| Filler 4 | 1.3 | 5.6 |
| Comparative Filler 1 | 4.4 | 3.3 |
| Comparative Filler 2 | 2.9 | 6.8 |

TABLE 4

|  |  | Crystallized Glass 1 | Crystallized Glass 2 | Crystallized Glass 3 |
|---|---|---|---|---|
| Glass Composition (mol %) | $SiO_2$ | 49.0 | 47.0 | 45.0 |
|  | $Al_2O_3$ |  | 1.0 |  |
|  | MgO | 4.5 | 9.0 | 4.0 |
|  | CaO | 6.0 | 13.0 | 10.0 |
|  | BaO | 28.5 | 12.3 | 24.5 |
|  | ZnO | 8.0 | 17.1 | 11.0 |
|  | $TiO_2$ | 3.0 |  | 5.0 |
|  | $ZrO_2$ | 0.5 |  |  |
|  | $La_2O_3$ | 0.5 | 0.6 | 0.5 |

TABLE 4-continued

|  | Crystallized Glass 1 | Crystallized Glass 2 | Crystallized Glass 3 |
|---|---|---|---|
| MgO + CaO + SrO + BaO | 39.0 | 34.3 | 38.5 |
| $Li_2O + Na_2O + K_2O$ | 0 | 0 | 0 |
| $TiO_2 + ZrO_2$ | 3.5 | 0 | 5.0 |
| Thermal Expansion Coefficient α 50-850° C. ($10^{-7}$/° C.) | 125 | 123 | 124 |

Thereafter, the lead-free glass powder and the α-quartz filler powder, and optionally the ceramic filler powder, were mixed at the mixing ratio of each of Examples 1 to 34 and Comparative Examples 1 to 6, and then fired. The thermal expansion coefficient of each green compact was measured and evaluated. The mixed powder was also mixed with a vehicle obtained by dissolving ethyl cellulose into terpineol, to produce a paste. The paste was printed on a desired substrate, which was dried and then fired at a desired temperature, and subjected to a withstand voltage test. Further, appearance evaluation was carried out for the film after firing. The results are shown in Tables 5 to 9.

TABLE 5

|  |  | Example 1 | Example 2 | Example 3 | Example 4 | Example 5 | Example 6 | Example 7 | Example 8 |
|---|---|---|---|---|---|---|---|---|---|
| Glass (wt. %) |  | 82 | 82 | 60 | 80 | 75 | 72.5 | 70 | 80 |
| Filler (wt. %) | α-Quartz Filler | 18 | 18 | 40 | 20 | 25 | 27.5 | 30 | 20 |
|  | Ceramic Filler | 0 | 0 | 0 | 0 | 0 | 0 | 0 | 0 |
| Glass Type |  | Glass 3 | Glass 9 | Glass 3 | Glass 1 | Glass 1 | Glass 1 | Glass 1 | Glass 7 |
| α-Quartz Filler Type |  | Filler 2 | Filler 2 | Filler 2 | Filler 1 | Filler 1 | Filler 1 | Filler 1 | Filler 2 |
| Ceramic Filler Type |  | — | — | — | — | — | — | — | — |
| Thermal Expansion Coefficient α 50-550° C. ($10^{-7}$/° C.) | After Firing Once | 95 | 96 | 115 | 93 | 103 | 102 | 107 | 107 |
|  | After Firing Eight Times | 94 | 95 | 113 | 80 | 89 | 89 | 94 | 107 |
| Withstand Voltage Test |  | OK | OK | OK | OK | OK | OK | OK | OK |
| Appearance Cracks |  | ○ | ○ | ○ | ○ | ○ | ○ | ○ | ○ |
| α-Quartz Filler/Glass + α-Quartz Filler (wt. %) |  | 18.0 | 18.0 | 40.0 | 20.0 | 25.0 | 27.5 | 30.0 | 20.0 |
| Ceramic Filler (parts by weight) |  | 0 | 0 | 0 | 0 | 0 | 0 | 0 | 0 |

TABLE 6

|  |  | Example 9 | Example 10 | Example 11 | Example 12 | Example 13 | Example 14 | Example 15 | Example 16 |
|---|---|---|---|---|---|---|---|---|---|
| Glass (wt. %) |  | 80 | 80 | 75 | 80 | 80 | 75 | 75 | 72.5 |
| Filler (wt. %) | α-Quartz Filler | 20 | 20 | 25 | 20 | 20 | 25 | 25 | 27.5 |
|  | Ceramic Filler | 0 | 0 | 0 | 0 | 0 | 0 | 0 | 0 |
| Glass Type |  | Glass 8 | Glass 9 | Glass 10 | Glass 1 | Glass 1 | Glass 1 | Glass 1 | Glass 1 |
| α-Quartz Filler Type |  | Filler 2 | Filler 2 | Filler 2 | Filler 2 | Filler 3 | Filler 2 | Filler 3 | Filler 2 |
| Ceramic Filler Type |  | — | — | — | — | — | — | — | — |
| Thermal Expansion Coefficient α 50-550° C. ($10^{-7}$/° C.) | After Firing Once | 103 | 98 | 105 | 89 | 91 | 99 | 102 | 104 |
|  | After Firing Eight Times | 103 | 97 | 97 | 78 | 80 | 87 | 88 | 87 |
| Withstand Voltage Test |  | OK | OK | OK | OK | OK | OK | OK | OK |
| Appearance Cracks |  | ○ | ○ | ○ | ○ | ○ | ○ | ○ | ○ |
| α-Quartz Filler/Glass + α-Quartz Filler (wt. %) |  | 20.0 | 20.0 | 25.0 | 20.0 | 20.0 | 25.0 | 25.0 | 27.5 |
| Ceramic Filler (parts by weight) |  | 0 | 0 | 0 | 0 | 0 | 0 | 0 | 0 |

TABLE 7

|  |  | Example 17 | Example 18 | Example 19 | Example 20 | Example 21 | Example 22 | Example 23 | Example 24 |
|---|---|---|---|---|---|---|---|---|---|
| Glass (wt. %) |  | 72.5 | 70 | 70 | 75 | 75 | 75 | 75 | 75 |
| Filler (wt. %) | α-Quartz Filler | 27.5 | 30 | 30 | 25 | 25 | 25 | 25 | 25 |
|  | Ceramic Filler | 0 | 0 | 0 | 0 | 0 | 0 | 0 | 0 |
| Glass Type |  | Glass 1 | Glass 1 | Glass 1 | Glass 2 | Glass 3 | Glass 4 | Glass 5 | Glass 6 |
| α-Quartz Filler Type |  | Filler 3 | Filler 2 | Filler 3 | Filler 2 | Filler 2 | Filler 2 | Filler 2 | Filler 2 |
| Ceramic Filler Type |  | — | — | — | — | — | — | — | — |
| Thermal Expansion Coefficient α 50-550° C. ($10^{-7}$/° C.) | After Firing Once | 102 | 107 | 106 | 95 | 99 | 101 | 103 | 100 |
|  | After Firing Eight Times | 88 | 94 | 93 | 84 | 99 | 95 | 99 | 96 |
| Withstand Voltage Test |  | OK | OK | OK | OK | OK | OK | OK | OK |
| Appearance Cracks |  | ○ | ○ | ○ | ○ | ○ | ○ | ○ | ○ |
| α-Quartz Filler/Glass + α-Quartz Filler (wt. %) |  | 27.5 | 30.0 | 30.0 | 25.0 | 25.0 | 25.0 | 25.0 | 25.0 |
| Ceramic Filler (parts by weight) |  | 0 | 0 | 0 | 0 | 0 | 0 | 0 | 0 |

TABLE 8

|  |  | Example 25 | Example 26 | Example 27 | Example 28 | Example 29 | Example 30 | Example 31 | Example 32 |
|---|---|---|---|---|---|---|---|---|---|
| Glass (wt. %) |  | 79 | 75 | 75 | 70 | 75 | 75 | 75 | 75 |
| Filler (wt. %) | α-Quartz Filler | 18 | 16 | 16 | 21 | 16 | 16 | 20 | 16 |
|  | Ceramic Filler | 3 | 9 | 9 | 9 | 9 | 9 | 5 | 9 |
| Glass Type |  | Glass 2 | Glass 3 | Glass 3 | Glass 3 | Glass 3 | Glass 3 | Glass 3 | Glass 3 |
| α-Quartz Filler Type |  | Filler 2 | Filler 2 | Filler 2 | Filler 2 | Filler 2 | Filler 2 | Filler 2 | Filler 2 |
| Ceramic Filler Type |  | $TiO_2$ Filler | MgO Filler | $ZrO_2$ Filler | $BaTiO_3$ Filler | $SrTiO_3$ Filler | $BaZrO_3$ Filler | Crystallized Glass 1 | Crystallized Glass 2 |
| Thermal Expansion Coefficient α 50-550° C. ($10^{-7}$/° C.) | After Firing Once | 92 | 92 | 90 | 95 | 93 | 95 | 95 | 90 |
|  | After Firing Eight Times | 86 | 91 | 90 | 93 | 93 | 93 | 95 | 89 |
| Withstand Voltage Test |  | OK | OK | OK | OK | OK | OK | OK | OK |
| Appearance Cracks |  | ○ | ○ | ○ | ○ | ○ | ○ | ○ | ○ |
| α-Quartz Filler/Glass + α-Quartz Filler (wt. %) |  | 18.6 | 17.6 | 17.6 | 23.1 | 17.6 | 17.6 | 21.1 | 17.6 |
| Ceramic Filler (parts by weight) |  | 3.1 | 9.9 | 9.9 | 9.9 | 9.9 | 9.9 | 5.3 | 9.9 |

TABLE 9

|  |  | Example 33 | Example 34 | Comparative Example 1 | Comparative Example 2 | Comparative Example 3 | Comparative Example 4 | Comparative Example 5 | Comparative Example 6 |
|---|---|---|---|---|---|---|---|---|---|
| Glass (wt. %) |  | 75 | 75 | 83.5 | 83.5 | 80 | 80 | 80 | 80 |
| Filler (wt. %) | α-Quartz Filler | 20 | 16 | 16.5 | 16.5 | 20 | 20 | 20 | 0 |
|  | Ceramic Filler | 5 | 9 | 0 | 0 | 0 | 0 | 0 | 20 |
| Glass Type |  | Glass 3 | Glass 3 | Glass 1 | Glass 1 | Glass 1 | Glass 1 | Comparative Glass 1 | Glass 1 |

TABLE 9-continued

| | | Example 33 | Example 34 | Comparative Example 1 | Comparative Example 2 | Comparative Example 3 | Comparative Example 4 | Comparative Example 5 | Comparative Example 6 |
|---|---|---|---|---|---|---|---|---|---|
| α-Quartz Filler Type | | Filler 2 | Filler 2 | Filler 1 | Filler 2 | Comparative Filler 1 | Comparative Filler 2 | Filler 2 | — |
| Ceramic Filler Type | | Crystallized Glass 3 | Crystallized Glass 3 | — | — | — | — | — | Zircon Filler |
| Thermal Expansion Coefficient α 50-550° C. ($10^{-7}/°$ C.) | After Firing Once | 90 | 92 | 90 | 89 | 97 | 85 | — | 71 |
| | After Firing Eight Times | 90 | 91 | 85 | 79 | 90 | 81 | — | 68 |
| Withstand Voltage Test | | OK | OK | NG | NG | NG | NG | — | — |
| Appearance Cracks | | ○ | ○ | ○ | X | X | X | X | X |
| α-Quartz Filler/ Glass + α-Quartz Filler (wt. %) | | 21.1 | 17.6 | 16.5 | 16.5 | 20 | 20 | 20 | 0 |
| Ceramic Filler (parts by weight) | | 5.3 | 9.9 | 0 | 0 | 0 | 0 | 0 | 25 |

(1) Softening Point, Crystallization Peak Temperature

About 40 mg of glass powder was filled in a platinum cell, and a DTA apparatus (Thermo Plus TG8120, manufactured by Rigaku Corporation) was used to measure the softening point (Ts) and the crystallization peak temperature (Tp) by increasing the temperature from room temperature at 20° C./min.

(2) Thermal Expansion Coefficient of Glass

The glass block obtained was cut into a piece of about 5×5×15 mm, which was polished to obtain a sample for measurement. A TMA apparatus was used to obtain an average thermal expansion coefficient (α) between two points of 50° C. and 500° C., from a thermal expansion curve which was obtained when the temperature was increased from room temperature at 10° C./min.

(3) Average Particle Diameter

A laser scattering particle size distribution analyzer was used to obtain a value of $D_{50}$ in volume distribution mode.

(4) Specific Surface Area

This was measured through physical adsorption of $N_2$.

(5) Thermal Expansion Coefficient of Green Compact

The obtained lead-free glass powder and α-quartz filler powder, and optionally ceramic filler powder, were mixed in a wet state. The mixture was introduced into a mold having an inner diameter of 30 mm, and press molded. It was then placed on an alumina substrate, and fired at 850° C. for 15 minutes. To see a change in thermal expansion coefficient caused by repeated firing, one-time firing and eight-time firing were conducted.

The sintered body thus obtained was cut into a piece of about 5×5×15 mm to produce a test specimen. For the test specimen, an average thermal expansion coefficient (α) between two points of 50° C. and 500° C. was obtained, using a TMA apparatus, from a thermal expansion curve which was obtained when the temperature was increased from room temperature at 10° C./min.

(6) Withstand Voltage Test

The voltage was maintained at 1.5 kV for 60 seconds, and a leakage current was measured. One with the leakage current of 8 mA or less was evaluated as "passed" (OK), while one with the leakage current exceeding 8 mA was evaluated as "failed" (NG).

(7) Thermal Expansion Coefficient of Crystallized Glass

The crystallized glass powder was introduced into a mold having an inner diameter of 20 mm, and press molded. It was then placed on an alumina substrate, and fired at a temperature of 800° C. or higher. It was then cut into a piece of about 5×5×15 mm, which was polished to obtain a sample for measurement. An average thermal expansion coefficient (α) between two points of 50° C. and 850° C. was obtained, using a TMA apparatus, from a thermal expansion curve which was obtained when the temperature was increased from room temperature at 10° C./min.

EXAMPLES

The present invention will be described in more detail below by giving examples, although the examples are not intended to limit the present invention.

Example 1

82 wt. % of Glass 3 powder and 18 wt. % of α-Quartz Filler 2 powder were mixed in a wet state. The mixture was heated to 850° C. in two hours, and held for 15 minutes to obtain a sintered body. An average thermal expansion coefficient (α) between two points of 50° C. and 500° C. of this sintered body was obtained, which was $95×10^{-7}/°$ C. The sintered body was fired seven more times in a similar manner to obtain a sintered body fired eight times. An average thermal expansion coefficient (α) between two points of 50° C. and 500° C. of this sintered body was obtained, which was $94×10^{-7}/°$ C. Further, the mixed powder was mixed with a vehicle obtained by dissolving ethyl cellulose into terpineol, to produce a paste. The paste was printed on a stainless steel substrate, dried, and fired at 850° C. It was then subjected to a withstand voltage test and an inspection for cracks. The results were both "passed" (OK, ○).

It should be noted that in the appearance inspection, one which produced no cracks was evaluated as "○", while one which produced cracks was evaluated as "x".

Examples 2 to 24

Similarly as in Example 1, a mixture obtained by mixing raw materials in a wet state was fired and a thermal expansion coefficient was obtained. Further, the mixed powder was mixed with a vehicle having ethyl cellulose dissolved in terpineol, thereby producing a paste. The paste was printed on a SUS substrate, dried, and fired at 850° C. It was then subjected to a withstand voltage test and an inspection for cracks. The results were both "passed" (OK, ○).

Example 25

79 wt. % of Glass 2 powder, 18 wt. % of α-Quartz Filler 2 powder, and 3 wt. % of $TiO_2$ Filler powder were mixed in a wet state. The mixture was heated to 850° C. in two hours, and held for 15 minutes to obtain a sintered body. An average thermal expansion coefficient (α) between two points of 50° C. and 500° C. of this sintered body was obtained, which was $92 \times 10^{-7}/°$ C. The sintered body was fired seven more times in a similar manner to obtain a sintered body fired eight times. An average thermal expansion coefficient (α) between two points of 50° C. and 500° C. of this sintered body was obtained, which was $86 \times 10^{-7}/°$ C. Further, the mixed powder was mixed with a vehicle having ethyl cellulose dissolved in terpineol, thereby producing a paste. The paste was printed on a stainless steel substrate, dried, and fired at 850° C. It was then subjected to a withstand voltage test and an inspection for cracks. The results were both "passed" (OK, ○).

Examples 26 to 30

Similarly as in Example 25, a mixture obtained by mixing raw materials in a wet state was fired and a thermal expansion coefficient was obtained. Further, the mixed powder was mixed with a vehicle having ethyl cellulose dissolved in terpineol, thereby producing a paste. The paste was printed on a SUS substrate, dried, and fired at 850° C. It was then subjected to a withstand voltage test and an inspection for cracks. The results were both "passed" (OK, ○).

Example 31

75 wt. % of Glass 3 powder, 20 wt. % of α-Quartz Filler 2 powder, and 5 wt. % of Crystallized Glass 1 powder were mixed in a wet state. The mixture was heated to 850° C. in two hours, and held for 15 minutes to obtain a sintered body. An average thermal expansion coefficient (α) between two points of 50° C. and 500° C. of this sintered body was obtained, which was $95 \times 10^{-7}/°$ C. The sintered body was fired seven more times in a similar manner to obtain a sintered body fired eight times. An average thermal expansion coefficient (α) between two points of 50° C. and 500° C. of this sintered body was obtained, which was $95 \times 10^{-7}/°$ C. Further, the mixed powder was mixed with a vehicle having ethyl cellulose dissolved in terpineol, thereby producing a paste. The paste was printed on a stainless steel substrate, dried, and fired at 850° C. It was then subjected to a withstand voltage test and an inspection for cracks. The results were both "passed" (OK, ○).

Examples 32 to 34

Similarly as in Example 31, a mixture obtained by mixing raw materials in a wet state was fired and a thermal expansion coefficient was obtained. Further, the mixed powder was mixed with a vehicle having ethyl cellulose dissolved in terpineol, thereby producing a paste. The paste was printed on a stainless steel substrate, dried, and fired at 850° C. It was then subjected to a withstand voltage test and an inspection for cracks. The results were both "passed" (OK, ○).

Comparative Example 1

83.5 wt. % of Glass 1 powder and 16.5 wt. % of α-Quartz Filler 1 powder were mixed in a wet state. The mixture was heated to 850° C. in two hours, and held for 15 minutes to obtain a sintered body. An average thermal expansion coefficient (α) between two points of 50° C. and 500° C. of this sintered body was obtained, which was $90 \times 10^{-7}/°$ C. The sintered body was fired seven more times in a similar manner to obtain a sintered body fired eight times. An average thermal expansion coefficient (α) between two points of 50° C. and 500° C. of this sintered body was obtained, which was $85 \times 10^{-7}/°$ C. Further, the mixed powder was mixed with a vehicle having ethyl cellulose dissolved in terpineol, thereby producing a paste. The paste was printed on a stainless steel substrate, dried, and fired at 850° C. It was then subjected to a withstand voltage test. The result was "failed" (NG).

Comparative Examples 2 to 4

Similarly as in Comparative Example 1, a mixture obtained by mixing raw materials in a wet state was fired and a thermal expansion coefficient was obtained. Further, the mixed powder was mixed with a vehicle having ethyl cellulose dissolved in terpineol, thereby producing a paste. The paste was printed on a stainless steel substrate, dried, and fired at 850° C. It was then subjected to a withstand voltage test and an inspection for cracks. The results were both "failed" (NG, x).

Comparative Example 5

80 wt. % of Comparative Glass 1 powder and 20 wt. % of α-Quartz Filler 2 powder were mixed in a wet state to obtain mixed powder. This mixed power was mixed with a vehicle having ethyl cellulose dissolved in terpineol, thereby producing a paste. The paste was printed on a stainless steel substrate, dried, and fired at 850° C. It was then subjected to an inspection for cracks. The result was "failed" (x), as the paste was partially not adhered to the substrate, and cracks were found in the adhered portion.

Comparative Example 6

80 wt. % of Glass 1 powder and 20 wt. % of Zircon Filler powder were mixed in a wet state. The mixture was heated to 850° C. in two hours, and held for 15 minutes to obtain a sintered body. An average thermal expansion coefficient (α) between two points of 50° C. and 500° C. of this sintered body was obtained, which was $71 \times 10^{-7}/°$ C. The sintered body was fired seven more times in a similar manner to obtain a sintered body fired eight times. An average thermal expansion coefficient (α) between two points of 50° C. and 500° C. of this sintered body was obtained, which was $68 \times 10^{-7}/°$ C. Further, the mixed power was mixed with a vehicle having ethyl cellulose dissolved in terpineol, thereby producing a paste. The paste was printed on a stainless steel substrate, dried, and fired at 850° C. It was then subjected to an inspection for cracks. The result was "failed" (x), with the presence of cracks.

INDUSTRIAL APPLICABILITY

The mixture of the glass and the filler of the present invention, when fired at a temperature of 850° C. or higher, can provide a dense insulating film on a metallic substrate. It can also be used as a sealing member at a site where it is necessary to seal between metal and ceramic, or between metal and metal, which are used at high temperatures.

The invention claimed is:
1. An insulating layer forming material containing a lead-free glass composition and an α-quartz filler, containing 17.0-40.0 wt. % of the α-quartz filler and 60.0-83.0 wt. % of the lead-free glass composition, the α-quartz filler having an average particle diameter ($D_{50}$) of 1.0-3.5 μm and a specific surface area of 2.5-6.5 $m^2/g$, the lead-free glass composition including no $B_2O_3$ and comprising a composition, in mol %, of:
40.0-60.0% $SiO_2$,
0.5-10.0% $Al_2O_3$,
20.0-45.0% MgO+CaO+SrO+BaO,
5.0-23.0% ZnO, and
0-10.0% $Li_2O+Na_2O+K_2O$.

2. The insulating layer forming material according to claim 1, wherein the content of the α-quartz filler is 20.0-35.0 wt. % and the content of the lead-free glass composition is 65.0-80.0 wt. %.

3. The insulating layer forming material according to claim 1, wherein the lead-free glass composition includes no $B_2O_3$ and comprises a composition, in mol %, of:
40.0-55.0% $SiO_2$,
3.0-8.0% $Al_2O_3$,
20.0-40.0% MgO+CaO+SrO+BaO,
10.0-18.0% ZnO, and
0-2.0% $Li_2O+Na_2O+K_2O$.

4. The insulating layer forming material according to claim 1, wherein a ceramic filler is contained in an amount of 0.01-10.0 parts by weight with respect to 100 parts by weight in total of the lead-free glass composition and the α-quartz filler.

5. The insulating layer forming material according to claim 4, wherein the ceramic filler contains one species or two or more species selected from $TiO_2$, MgO, $ZrO_2$, $BaTiO_3$, $SrTiO_3$, and $BaZrO_3$.

6. The insulating layer forming material according to claim 4, wherein the ceramic filler is a crystallized glass formed by heat treatment at 800° C. or higher, and its thermal expansion coefficient α from 50° C. to 850° C. is $120\times10^{-7}$/° C. or more.

7. An insulating layer forming paste obtained by adding at least an organic binder and a solvent to the insulating layer forming material according to claim 1.

8. The insulating layer forming material according to claim 2, wherein the lead-free glass composition includes no $B_2O_3$ and comprises a composition, in mol %, of:
40.0-55.0% $SiO_2$,
3.0-8.0% $Al_2O_3$,
20.0-40.0% MgO+CaO+SrO+BaO,
10.0-18.0% ZnO, and
0-2.0% $Li_2O+Na_2O+K_2O$.

9. The insulating layer forming material according to claim 2, wherein a ceramic filler is contained in an amount of 0.01-10.0 parts by weight with respect to 100 parts by weight in total of the lead-free glass composition and the α-quartz filler.

10. The insulating layer forming material according to claim 3, wherein a ceramic filler is contained in an amount of 0.01-10.0 parts by weight with respect to 100 parts by weight in total of the lead-free glass composition and the α-quartz filler.

11. An insulating layer forming paste obtained by adding at least an organic binder and a solvent to the insulating layer forming material according to claim 2.

12. An insulating layer forming paste obtained by adding at least an organic binder and a solvent to the insulating layer forming material according to claim 3.

13. An insulating layer forming paste obtained by adding at least an organic binder and a solvent to the insulating layer forming material according to claim 4.

14. An insulating layer forming paste obtained by adding at least an organic binder and a solvent to the insulating layer forming material according to claim 5.

15. An insulating layer forming paste obtained by adding at least an organic binder and a solvent to the insulating layer forming material according to claim 6.

* * * * *